Feb. 25, 1969   R. ABEL, JR   3,429,571
PROGRAMMED SWING TRAINING DEVICE
Filed Dec. 8, 1966
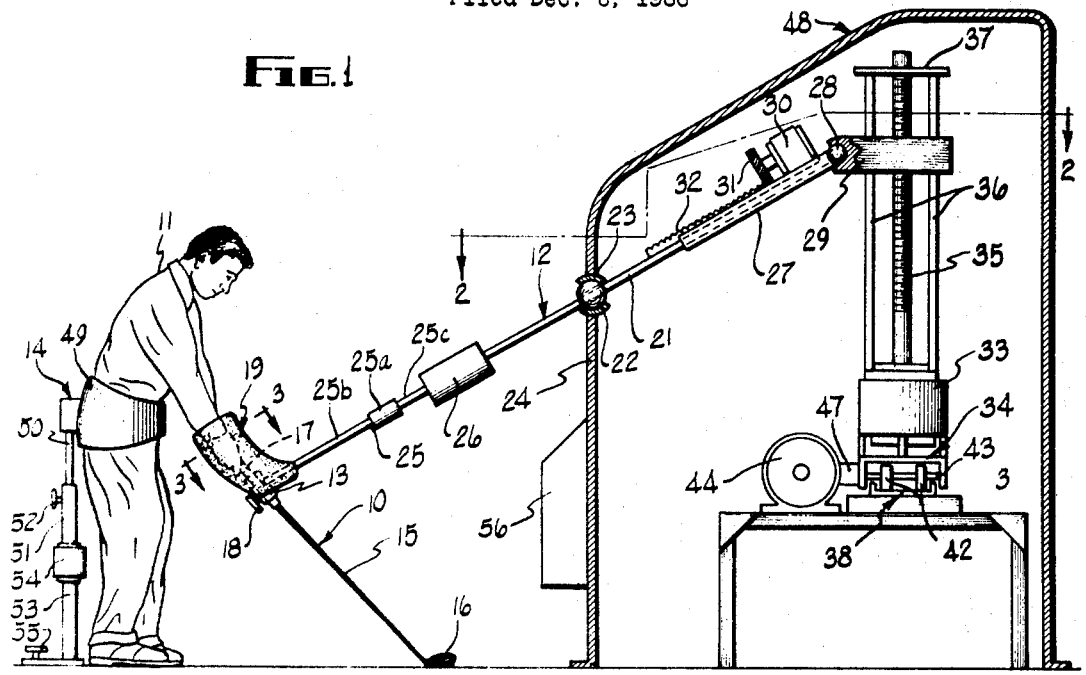
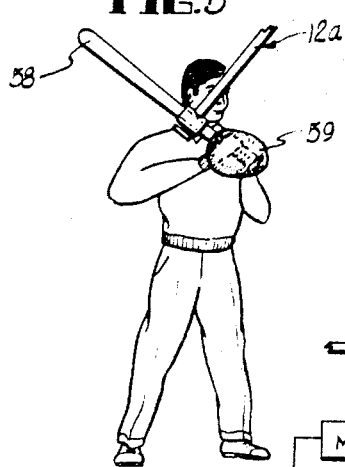
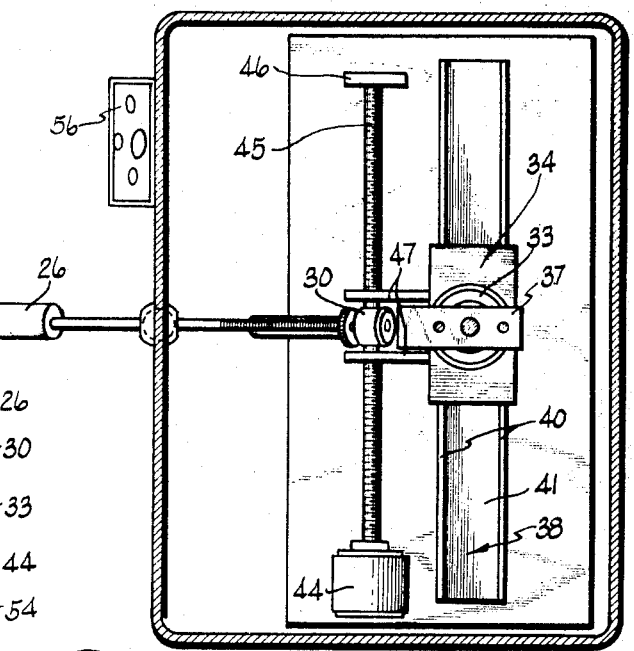
INVENTOR
ROY ABEL JR.

United States Patent Office 3,429,571
Patented Feb. 25, 1969

3,429,571
PROGRAMMED SWING TRAINING DEVICE
Roy Abel, Jr., 1 W. Orchard Place,
Mount Prospect, Ill. 60056
Filed Dec. 8, 1966, Ser. No. 600,072
U.S. Cl. 273—26                10 Claims
Int. Cl. A63b 69/36

ABSTRACT OF THE DISCLOSURE

A ball joint reciprocably mounts the central part of a rockable shaft having upper and lower ends. The lower end of the shaft mounts a hand receiving mitt and a holder for gripping a club such as a baseball bat or golf club. Motors are provided to move the upper end of the shaft both vertically and horizontally. Other motors cause the shaft to reciprocably move through the ball joint and the lower end of the shaft to rotate about its longitudinal axis. Another motor causes movement of a hip engaging member. Programming means are provided to coordinate the driving action of all motors and impart predetermined movement to the lower end of the shaft and the hips of the user.

---

This invention relates in general to a golf or batting teaching device for teaching a person how to correctly coordinate body movements during the swinging of a golf club or a bat, and more particularly to a golf or batting teaching device that can be readily adapted to teach any person how to correctly coordinate the respective motions of different parts of a person's body during the golf or batting swing so that a person may more quickly perfect a golf or batting swing, and still more particularly to a golf or batting teaching device capable of translating programmed body movements to a person for development of a grooved golf or batting swing.

Heretofore, many different types of golf teaching devices or apparatuses have been developed for teaching a person the proper method of generating a golf swing, but such apparatuses have been unduly complex in mechanism and therefore costly and impractical to manufacture. For example, the apparatus shown in U.S. Patent 2,737,432 is one that is mechanically complex with a great number of parts and quite limited in its flexibility, and therefore costly to manufacture and necessitating considerable maintenance.

The golf or batting teaching device of the present invention includes relatively simple mechanical components arranged together to teach those coordinated body motions necessary to a good golf or batting swing, and to especially provide the necessary three-dimensional movement of a club or bat to which the golf or batting student is associated, all of which may be controlled and programmed by a unit of the type presently available such as one that uses punched or magnetic tape. Any type of swing may be programmed making the device completely flexible. More particularly, movement of the club or bat by a rock shaft is determined by the coordinated programming of four different driving devices, while the movement of the hips is controlled by a single driving device. It should be appreciated that the driving device may be of any suitable type such as D.C. electric motors, hydraulic motors, or the like.

It is therefore an object of the present invention to provide a new and improved golf or batting teaching device for teaching a proper golf or batting swing to golf or batting students.

Another object of this invention is in the provision of a golf or batting teaching device that is made of a relatively few number of parts and therefore simple and economical to manufacture.

Another object of this invention resides in the provision of a golf or batting teaching device employing a programmed controller for defining the coordinated body movements necessary for developing a proper golf or batting swing.

A further object of this invention is to provide a golf or batting teaching device including a rock shaft adapted to have a club or bat secured to one end and also having secured thereto means for aiding the golf or batting student to properly position and hold his hands on the club or bat.

Other objects, features and advantages of the invention will be apparent from the following detailed disclosure, taken in conjunction with the accompanying sheet of drawing, wherein like reference numerals refer to like parts, in which:

FIG. 1 is a side elevational view of the golf teaching device according to the present invention and a student golfer in the position of addressing a ball, and showing some parts in section and other parts in phantom for purposes of clarity;

FIG. 2 is a sectional view taken substantially along line 2—2 of FIG. 1 and essentially showing in plan the teaching device of the invention;

FIG. 3 is an enlarged sectional view taken substantially along lines 3—3 of FIG. 1;

FIG. 4 is a box diagram view of the control and programmer of the present invention and the motors of the teaching device; and FIG. 5 is a side elevational view of a batter in batting position with the teaching device of the present invention.

Referring now to the drawings, the teaching device of the invention as used for golf is illustrated in FIG. 1, together with a golf club 10 associated therewith and a golf student 11 where the student is shown in position of addressing a ball. In general, the golf teaching device includes a rock shaft or control rod 12 having a club holder 13 on the driven end for securing a club thereto adjacent the handle of the club and mounted so that the rock shaft driven end is movable three-dimensionally, and a hip control unit 14.

The club 10 includes a shaft 15 having a head 16 at the lower end and a handle 17 at the upper end. The club holder 13 is adapted to secure any type of club to the driven end of the rock shaft 12, and while not specifically shown, generally includes a tubular member with an opening therethrough to receive the handle end of a club, and a setscrew 18 for coacting to grip the handle end of the club and essentially fasten it to the driven end of the rock shaft. Thus, it is only necessary to loosen the setscrew 18 to remove a club and replace it with another when it is desired to teach with a different club.

In order to aid the student in the proper gripping of the handle 17 of the club, a mitt or hand receiving member 19 is arranged at the driven end of the rock shaft, being suitably fastened thereto and having an opening 20 within which the handle 17 of the club is arranged and into which the hands of the golf student are positioned for gripping of the club handle 17. The mitt 19 would preferably be made of a resilient material such as foam rubber with a rigid outer shell of plastic or the like to effectively grip tightly the hands of the student around the club handle. The opening 20 may even have contoured surfaces for further indicating the proper placement of the hands on the club handle. Thus, the mitt 19 effectively and properly connects the hands of the golf student to the club and to the driven end of the rock shaft 12 to control hand and arm movement according to a chosen program. Alternatively, the rock shaft could be connected solely to the mitt 19, whereby the club is connected to the rock shaft only through the hands of the golfer.

The rock shaft 12 includes a shaft section 21 that is slidably received in a hole extending through a ball 22 arranged in a socket 23 suitably supported by a panel 24 above ground level and preferably above where the driven end of the rock shaft is positioned during addressing of a ball. Thus, a universal joint is defined so the driven end of the rock shaft is movable three-dimensionally. In order to prevent rotation of the shaft section 21, splining is provided on the section that coacts with splining in the hole of the ball, which however allows slidable movement of the shaft section through the ball.

The lower shaft section 25 is interconnected to the shaft section 21 by a drive means such as a suitable motor 26, whereby actuation of the motor 26 will effect rotation of the lower shaft section 25 and the driven end of the shaft relative to the shaft section 21. A flexible coupling 25a is provided along the lower shaft section 25 between sub-sections 25b and 25c to impart a more natural feel to the swing. This coupling may be adjustable to vary the rigidity between the sub-sections.

Movement of the rock shaft relative the ball and socket joint 22, 23 is obtained by telescoping the upper end of the shaft section 21 into a tubular member 27, the free end of which is provided with a ball 28 received in a socket on a vertically movable carriage 29. A motor 30 mounted on the tubular member 27 drives a worm gear 31 that is in meshing engagement with a rack gear 32 secured to the upper end of the shaft section 21 for effecting extension of the rock shaft and movement through the ball and socket joint 22, 23. The tubular member 27 may have an elongated slot through which the rack gear 32 protrudes for engagement with the worm gear 31.

Vertical movement of the carriage 29 is controlled by a motor 33 mounted on a trolley or carriage 34, and having an upright threaded shaft 35 engageable in a threaded nut or ball nut fastened to the carriage 29. The carriage is further guided vertically by upright guideways 36 secured at the lower end to the trolley 34 and connected at their upper end by a cross bar 37. The upper end of the shaft 35 is also supported by the cross bar 37. Thus, actuation of the motor 33 controls vertical movement of the carriage 29 and up and down movement of the driven end of the rock shaft 12 by transmitting a force into the drive end of the rock shaft.

The trolley or carriage 34 is guided for horizontal movement along a rectilinear path substantially perpendicular to the position of the rock shaft during address of the ball by means of a trackway 38 mounted on a table 39. Upstanding flanges 40 are provided on the trackway 38 and between which is a bottom 41. Rollers 42 are mounted on shafts 43 carried by the trolley or carriage 34, whereby the rollers 42 engage in the bed or bottom 41 of the trackway, and are spaced apart to be guidably engaged by the trackway flanges. A motor 44 is also mounted on the table 39, and is provided with a threaded shaft 45 supported at its free end by a bearing member 46, and in meshing engagement with threaded nuts or ball nuts secured in arms 47 that extend laterally from the trolley or carriage 34. Thus, actuation of the motor 44 effects horizontal movement of the trolley 34 and the drive end of the rock shaft 12 to thereby effect a back and forth movement of the driven end of the rock shaft.

Although not completely necessary, the majority of the operating parts for transmitting three-dimensional movement to the driven end of the rock shaft 12 are enclosed by a cover structure 48, of which the front wall or panel 24 serves to support the ball and socket joint 22, 23. Enclosing of this equipment removes a possible distraction from the concentration of the golf student in that the moving parts within the cover structure cannot be observed in action and transmittal to the student of at least part of the noise generated by the moving parts is reduced.

Control of hip and leg movement is obtained by the hip control unit 14 which includes a padded or cushioned harness 49 adapted to be fitted over the hips of the student golfer. The harness is attached to the upper end of a rod support 50 that is telescopically received in an upper tubular support member 51, and therefore adjustable therewith to fit the proper height of the golf student. A setscrew 52 may be tightened or loosened to effect vertical height adjustment of the harness rod support 50. The upper tubular support 51 is rotatably supported on a base 53 by means of a motor 54. A locating device 55 may be provided on the base in order to locate the hip control unit in a proper location for a golf student, which locating device would coact with the surface on which the golf student would stand. Thus, actuation of the motor 54 effects rotation of the hip harness 49 to control rotation of the hips and leg movement of the golf student during the golf swing.

There may also be provided on the surface supporting the hip harness locating means for the feet of the golf student and the ball so that a student can learn the relative positions between the feet and the ball and therefore the proper stance when executing the golf swing.

It can therefore be appreciated that the hands, arms, shoulders and upper body movements can be controlled by movement of the rock shaft 12, while hip movement and leg movement is controlled by the hip control unit 14. In order to coordinate the various body movements to define a proper or desired golf swing for teaching or training a particular golfer, a controller and programmer 56 controls the actuation of the motors 26, 30, 33, 44 and 54. The controller and programmer 56 is shown as being mounted on the front wall 24 of the cover structure 48, although it can be appreciated that it could be mounted in any convenient location. Although the details of the controller and programmer are not shown, it should be appreciated that it may be of a type presently available on the market capable of coordinating the actuation of a plurality of motors, such as the punch or magnetic tape type. Where tape is employed, it may be arranged in cartridges that may be easily inserted into the programmer and the desired swing for a particular golfer may be programmed on a tape by any suitable method. It should also be appreciated that the device of the invention could be employed to record the swing of a golfer on tape which could thereafter be used to further teach the golfer. A suitable start button may be provided for the controller and programmer in order to initiate operation of the motors for generating the swing, and the start button may either be provided on a panel on the controller or remotely positioned to be operated by the golfing student, such as through a foot button or hand button within the mitt. Moreover, a dead man's switch man be mounted within the mitt 19, which would be operative to stop all motors if the golfer were to remove his hands at any time to thereby prevent inadvertent injury due to continued movement of the club and rock shaft. The motors may be of any suitable type such as direct current electric motors or hydraulic motors, although it is believed that direct current electric motors would provide more complete flexibility as to speed and safety features.

In operation of the device of the present invention, a tape programmed with a swing for a particular golf student would be arranged in the readout portion of the controller and programmer 56, and at the signal to start, coordinated action would be generated through the motors 26, 30, 33 and 44 to swing the driven end of the rock shaft 12 through the proper arc, and the motor 54 to operate the hip harness 49. Before initiating the swing, the golf student would of course be in position such as shown in FIG. 1 where the hands would be arranged on the club handle and within the mitt 19, the feet in the proper stance relative to the club and position of the ball, and the hips arranged in the lip harness 49 which would be adjusted for a particular golfer. The particular tape employed in the controller and programmer would be such as to fit the golf student and the club utilized together with the type of swing desired for that club for teaching, training, or warm-up exercises.

The teaching device of the present invention, when used for golf, could also be employed for analyzing the swing of a golfer, wherein a desired swing could be programmed into the device and measuring elements would measure the resistance against carrying through the programmed swing. Such measuring elements could be in the form of electronic circuitry wired into the motors whereby they would sense a force and value thereof that would oppose the programmed swing. Such a swing analyzer is indicated by the block 57 in FIG. 4. From the information received, a trained teacher could help the student by suggesting remedies for overcoming the tendencies to oppose the proper swing. It should also be more fully appreciated that the device of the present invention could be used by a golfer during warm-up before playing a game, and such a warm-up could condition a golfer to the swing best suited to him for most efficiently hitting the ball.

Referring now to FIG. 5, the present invention could likewise be applied for teaching, training and warm-up exercises of a ball player for batting purposes. Again, the rock shaft 12A would be controlled through its movements by the same type of mechanism as shown in FIG. 1 relative to golfing. Thus, the rock shaft 12A would be connected directly to the handle of a bat 58. A mitt 59 could be used in a similar fashion to the mitt 19 wherein the mitt would receive and tightly grip the hands of a batter over the handle of the club, and the mitt would be attached to the rock shaft 12A. Or as in the other embodiment, the mitt may be alone attached to the rock shaft 12A leaving as the only connection between the bat and the rock shaft the hands of the batter. For use in batting, the rock shaft 12A would have to be supported so that its movements would not interfere with the person of the batter as it would take the bat and batter's hands through the necessary movements to produce a proper swing. The device could program the swing so that it would carry the bat through a path to meet an on-coming ball thrown mechanically in a certain area in front of the batter, such facilitating the teaching of where to swing with the ball coming into a particular zone. The swing could be programmed to hit high, low, inside, outside, or down the middle balls, or any variation thereof. Moreover, an optical scanning unit could be connected into the programmer and controller 56 to analyze the path of a pitched ball and thereby cause the swing to be programmed for hitting the ball. Again, it should be appreciated that the device, when used for batting, could also be arranged to analyze or record the swing of a batter.

While the present invention has been described relative to use for a golfing swing or a batting swing, it should be appreciated that it could likewise be applied in other sports where some implement is used to swing at a ball or object whether by use of one or two hands.

It will be understood that modifications and variations may be effected without departing from the scope of the novel concepts of the present invention, but it is understood that this application is to be limited only by the scope of the appended claims.

The invention is hereby claimed as follows:

1. A swing training device comprising, a rock shaft including a driven end and a drive end, mitt means on the driven end for receiving the hands of a person and driving same therewith, means for mounting the rock shaft so that the driven end is movable three-dimensionally, said mounting means including a universal joint supported above the driven end of the rock shaft, said joint having a bore therethrough reciprocably receiving said rock shaft, a carriage having the drive end of the rock shaft rotatively attached thereto, vertical, upright guide means for said carriage, said carriage being vertically movable along said guide means, means mounting said upright guide means for guided movement along a horizontal path extending substantially perpendicular to the rock shaft, first drive means for driving said upright guide means along said horizontal path, second drive means for driving said carriage vertically along said upright guide means, third drive means for driving said shaft reciprocably through said bore in said joint, and fourth drive means for rotating the driven end of said rock shaft about its longitudinal axis.

2. A swing training device as defined in claim 1, and programming means for coordinating the driving actions of all said drive means to impart predetermined movement to said driven end of said rock shaft.

3. A swing training device as defined in claim 1, wherein said universal joint includes a ball and socket joint.

4. A swing training device as defined in claim 1, and means mounted on the driven end of said rock shaft for receiving and coupling thereto an object striking element.

5. A swing training device as defined in claim 1, and hip engaging means engageable with the hips of a person for imparting predetermined movement thereto, and fifth drive means for driving said hip engaging means.

6. A golf training device as defined in claim 5, and programming means for coordinating the driving actions of all said drive means to impart predetermined movement to said driven end of said rock shaft and said hip engaging means.

7. A golf training device comprising, a rock shaft including a driven end and a drive end, a club holder on the driven end adapted to receive and hold a club, a mitt secured to the driven end adapted to receive and position the hands of a golfer about the handle of the club, when held by said holder, means for mounting the rock shaft so that the driven end is capable of three-dimensional movement, said mounting means including a joint having a ball in a socket supported above the driven end of said rock shaft and having a bore extending therethrough to reciprocably receive said rock shaft intermediate the drive and driven ends, a vertically movable carriage having the drive end of said rock shaft rotatively attached thereto, a horizontally movable support having upright guide means thereon for guiding the vertical movement of said vertically movable carriage, said horizontally movable support being movable along a rectilinear path extending substantially perpendicular to said rock shaft, a first motor for driving said horizontally movable support along said rectilinear path, a second motor for driving said carriage vertically along said upright guide means, a third motor for driving said shaft reciprocably through said bore in said ball, a fourth motor for rotating the driven end of said shaft about its longitudinal axis, and control means for actuating said motors in such timed relation as to impart a predetermined movement to the driven end of said shaft and effect a desired golf swing.

8. A golf training device as defined in claim 7, wherein said mitt is of resilient material.

9. A golf training device as defined in claim 7, and an upright stand, a hip control unit having a harness adapted to engage the hips of a golfer supported on the upright stand, a fifth motor on said stand and actuated by said control means for drivingly rotating said harness.

10. A golf training device as defined in claim 9, wherein said harness is of cushioned material.

(References on following page)

References Cited

UNITED STATES PATENTS

| 2,737,432 | 3/1956 | Jenks | 35—29 X |
| 3,078,597 | 2/1963 | Sharps | 35—29 |
| 3,277,879 | 10/1966 | Sayette. | |

ANTON O. OECHSLE, *Primary Examiner.*

GEORGE J. MARLO, *Assistant Examiner.*

U.S. Cl. X.R.

273—87.2, 89, 129, 189, 186, 187, 191; 46—145; 73—379; 35—29